United States Patent [19]

Cotting et al.

[11] Patent Number: 4,960,840

[45] Date of Patent: Oct. 2, 1990

[54] EPOXIDISED MODIFIED ACETOPHENONE/FORMALDEHYDE RESINS

[75] Inventors: Jacques-Alain Cotting, Bonnefontaine; Alfred Renner, Montelier, both of Switzerland

[73] Assignee: Ciba-Geigy Corporation, Ardsley, N.Y.

[21] Appl. No.: 396,410

[22] Filed: Aug. 18, 1989

[30] Foreign Application Priority Data

Aug. 22, 1988 [CH] Switzerland .................. 3110/88

[51] Int. Cl.$^5$ .................. C08G 2/30; C08G 16/04
[52] U.S. Cl. .................. 525/521; 528/227; 549/560; 525/438; 525/934
[58] Field of Search .................. 525/521; 528/227

[56] References Cited

U.S. PATENT DOCUMENTS

| | | | |
|---|---|---|---|
| 2,380,142 | 7/1945 | Ballard et al. | 528/227 |
| 2,462,031 | 2/1949 | Wittcoff | 549/423 |
| 2,600,764 | 6/1952 | Harvey | 528/223 |
| 4,542,194 | 9/1985 | Dörffel et al. | 525/521 |

FOREIGN PATENT DOCUMENTS 5067399 6/1975 Japan .

OTHER PUBLICATIONS

Chemical Abstract, vol. 50, 611.
Abstract of EP 41200 (12/81).

*Primary Examiner*—John Kight, III
*Assistant Examiner*—Frederick Krass
*Attorney, Agent, or Firm*—JoAnn Villamizar

[57] ABSTRACT

Polyglycidyl ethers which are obtainable by reacting acetophenone with 0.7 to 1.4 mol of formaldehyde per mol of acetophenone, in the presence of an alkaline catalyst and in the temperature range from 50° to 100° C., to a carbonylated acetophenone/formaldehyde resin, hydrogenating said carbonylated resin to a modified hydroxylated acetophenone/formaldehyde resin, subsequently converting said resin with epichlorohydrin, in the presence of a phase transfer catalyst, into the corresponding polychlorohydrin ether, and dehydrochlorinating said ether with a base, are suitable for use as epoxy resins, for example for the preparation of powder coating compositions having good resistance to chemicals and good adhesion.

11 Claims, No Drawings

EPOXIDISED MODIFIED ACETOPHENONE/FORMALDEHYDE RESINS

The present invention relates to epoxidised modified acetophenone/formaldehyde resins which are prepared by reacting acetophenone with 0.7 to 1.4 mol of formaldehyde per mol of acetophenone, followed by hydrogenation and subsequent glycidylation of the product, as well as to curable epoxy resin compositions containing said resins and to the use thereof for making crosslinked products, especially for the preparation of powder coating compositions.

Acetophenone/formaldehyde resins are known in the art and are described, for example, in Ullmanns Encyclopädie der technischen Chemie, 4th edition, Vol. 12, pages 549 and 550. They are prepared by alkalicatalysed condensation of acetophenone with formaldehyde and, depending on the ratio of the reactants and on the reaction conditions, have different molecular weights and contain a smaller or greater number of hydroxyl groups. Acetophenone/formaldehyde resins which are modified by hydrogenation are also known and likewise described in the publication referred to above.

The condensation of ketones with formaldehyde is disclosed in U.S. patent specification 2,462,031. Among the ketones which may be used for the condensation mention is also made of acetophenone.

Coating compositions based on epoxy resins which, in addition to containing epoxy resins of the bisphenol A and/or bisphenol F type and amine hardeners for epoxy resins, also contain ketone resins, for example cyclohexanone/formaldehyde resins, are disclosed in European patent specification 41 200. The addition of the ketone resin reduces degradation of the surface film caused by weathering and enhances the coverage of the coating.

Epoxy resin compositions wherein the epoxy resin component is obtained by glycidylation of hydantoin/formaldehyde condensates are disclosed in Japanese Patent Kokai Sho 50–67 399/1975. The water-resistance of these systems, however, is not satisfactory in all respects.

It has now been found that the reaction of specific modified acetophenone/formaldehyde resins with epichlorohydrin in the presence of a phase transfer catalyst, followed by dehydrochlorination of the chlorohydrin ethers so obtained, gives polyglycidyl ethers having excellent properties.

Specifically, the invention relates to polyglycidyl ethers which are obtainable by reacting acetophenone with 0.7 to 1.4 mol of formaldehyde per mol of acetophenone, in the presence of an alkaline catalyst and in the temperature range from 50 to 100° C., to a carbonylated acetophenone/formaldehyde resin, hydrogenating said carbonylated resin to a modified hydroxylated acstophenone/formaldehyde resin, subsequently converting said resin with epichlorohydrin, in the presence of a phase transfer catalyst, into the corresponding polychlorohydrin ether, and dehydrochlorinating said ether with a base.

The polyglycidyl ethers of this invention are obtained by using 0.7 to 1.4 mol of formaldehyde per mol of acetophenone when preparing the carbonylated acetophenone/formaldehyde resins. The use of less than 0.7 mol of formaldehyde gives ketone/formaldehyde resins having a high molecular weight and softening point, a low carbonyl group content, and poor solubility. On the other hand, the use of more than 1.4 mol of formaldehyde per mol of acetophenone results in the formation of viscous or liquid products which give polyglycidyl ethers which are unsuitable for the preparation of powder coating compositions e.g. Preferred polyglycidyl ethers of this invention are those obtained by using 0.9 to 1.1 mol preferably 1 mol, of formaldehyde per mol of acetophenone.

The reaction of the acetophenone with formaldehyde is preferably carried out in the presence of 0.05 to 0.3 mol, most preferably 0.1 to 0.2 mol, of an alkaline catalyst per mol of acetophenone. Examples of suitable alkaline catalysts are alkali metal hydroxides such as lithium, sodium or potassium hydroxide, alkaline earth metal hydroxides or oxides such as magnesium or calcium hydroxide or magnesium or calcium oxide, alkali metal alcoholates such as sodium or potassium methoxide or sodium or potassium ethoxide, or organic bases such as trimethylbenzylammonium hydroxide or basic amines. The preferred alkaline catalyst is sodium hydroxide.

The reaction of acetophenone with formaldehyde is preferably carried out in the temperature range from 60 to 90° C., more particularly from 70 to 90° C., for 2 to 5 hours, and takes place preferably in aqueous solution. The reaction may further be suitably carried out at constant pH, for example at ca. pH 12, by continuous addition of the requisite amount of an aqueous base, for example a solution of sodium hydroxide.

The carbonylated acetophenone/formaldehyde resin obtained in the condensation is hydrogenated in a manner known per se to a modified hydroxylated acetophenone/formaldehyde resin. The hydrogenation is preferably carried out in an inert solvent such as butanol, tetrahydrofuran, dioxan or in the melt in the presence of a hydrogenation catalyst. Examples of suitable catalysts are Raney nickel and metal catalysts such as nickel, palladium, palladium on copper or palladium on nickel.

Particularly suitable solvents are those which boil at temperatures above ca. 180° C. and in which the resin to be hydrogenated and also hydrogenation products are soluble. Examples of such solvents are high boiling ethers, esters and alcohols, especially the alkyl ethers of ethylene glycol or diethylene glycol. Methods of hydrogenating ketone/formaldehyde resins such as acetophenone/formaldehyde resins are described, for example, in German patent specifications 826 974 and 907 348 and in European patent application 111 686.

Acetophenone/formaldehyde resins which are modified by hydrogenation are also commercially available. Such a commercial product is Kunstharz SK ® supplied by Hüls AG.

The polyglycidyl ethers of this invention are subsequently prepared by reacting the hydroxylated acetophenone/formaldehyde resins with epichlorohydrin in the presence of a phase transfer catalyst, followed by dehydrochlorination of the condensate with a base such as aqueous sodium hydroxide. Examples of suitable phase transfer catalysts are tertiary sulfonium salts, quaternary phosphonium salts and, preferably, quaternary ammonium salts. It is preferred to use, for example, tetraethylammonium salts, tetrabutylammonium salts, benzyltrimethylammonium salts and, in particular, tetramethylammonium salts, for example chlorides. It is preferred to carry out the reaction with an excess of epichlorohydrin without a solvent, the phase transfer catalyst and the base being added as aqueous solutions.

During the reaction the solvent water and the water of reaction can conveniently be removed continuously by azeotropic distillation.

The polyglycidyl ethers of this invention are generally solid and preferably have a molecular weight $\overline{M}_n$ (gel permeation chromatography in THF) of 800–1100, a $\overline{M}_w/\overline{M}_n$ of 1.20 to 1.60, an epoxy value of 2.5 to 3.5 equivalents/kg, and a softening point of 70–100° C.

The polyglycidyl ethers of this invention contain recurring units of formula I

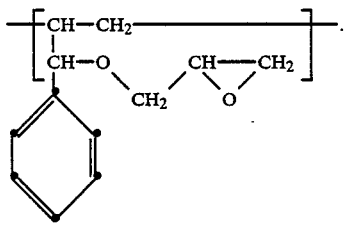

A possible structure of the compounds of this invention is illustrated by formula II

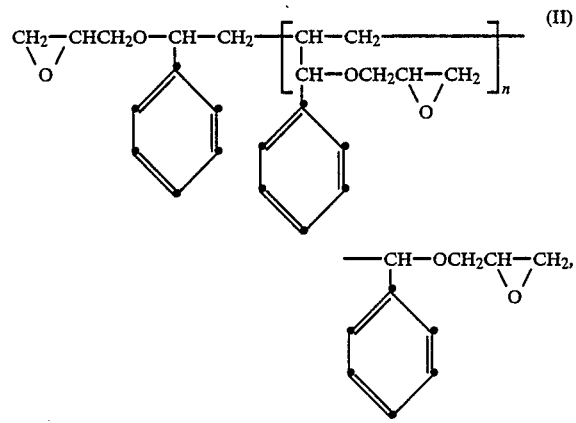

wherein n is an integer from 1 to 5, preferably 2 to 4.

The novel polyglycidyl ethers are suitable epoxy resins for making crosslinked products. On account of their oligomeric structure and their functionality, the novel polyglycidyl ethers are to some extent comparable to epoxy phenol novolaks, but they are distinguished by the good properties of cycloaliphatic epoxy resins, for example excellent weathering resistance.

The present invention thus also relates to curable mixtures comprising (a) a polyglycidyl ether according to the invention and (b) a curing agent and/or a curing catalyst for epoxy resins.

Typical examples of hardeners are the conventional hardeners for epoxy resins, including aliphatic, cycloaliphatic, aromatic and heterocyclic amines such as bis(4-aminophenyl)methane, aniline/formaldehyde resins, bis(4-aminophenyl)sulfone, propane-1,3-diamine, hexamethylenediamine, diethylenetriamine, triethylenetetramine, 2,2,4-trimethylhexane-1,6-diamine, m-xylylenediamine, bis(4-aminocyclohexyl)methane, 2,2-bis(4-aminocyclohexyl)propane and 3-aminomethyl-3,5,5-trimethylcyclohexylamine (isophoronediamine); polyaminoamides such as those obtained from aliphatic polyamines and dimerised or trimerised fatty acids; polyphenols such as resorcinol, hydroquinone, 2,2-bis(4-hydroxyphenyl)propane and phenol/aldehyde resins; polythiols such as the polythiols commercially available as "thiokols"; polycarboxylic acids and anhydrides thereof, for example phthalic anhydride, tetrahydrophthalic anhydride, hexahydrophthalic anhydride, hexachloroendomethylenetetrahydrophthalic anhydride, pyromellitic anhydride, 3,3',4,4'-benzophenonetetracarboxylic dianhydride, the acids of the aforementioned anhydrides as well as isophthalic acid and terephthalic acid. It is also possible to use catalytic hardeners, for example tin salts of alkanoic acids, e.g. tin octanoate, Friedels-Craft catalysts such as boron trifluoride and boron trichloride and their complexes and chelates which are obtained by reacting boron trifluoride with e.g. 1,3-diketones.

Especially suitable hardeners are carboxyl-terminated saturated polyesters which preferably contain on average more than two carboxyl groups per molecule, have an acid number of 15 to 100, and have an average molecular weight in the range from 500 to 10 000. The polyesters employed are preferably solid at room temperature and have a glass transition temperature in the range from 40° tro 80° C. Such polyesters are described for example in US patent specification 3,397,254 and in DE-OS 21 63 962. They can be obtained for example by reacting hydroxyl-terminated polyesters with tricarboxylic acids or tetracarboxylic dianhydrides. The hydroxyl-terminated polyesters are, in turn, reaction products of polyols with dicarboxylic acids or dicarboxylic anhydrides, and advantageously have an average degree of polymerisation of at least 3, in general from 3 to 25, preferably from 5 to 12. Examples of suitable polyols are ethylene glycol, glycerol, 1,4-butanediol, neopentanediol and cyclohexanediol. Examples of dicarboxylic acids are isophthalic acid, terephthalic acid, cyclohexanedicarboxylic acid, succinic acid, glutaric acid, adipic acid, pimelic acid, suberic acid, azelaic acid or sebacic acid.

The amount of hardener employed depends on the chemical nature of the hardener and on the desired properties of the curable mixture and of the cured product. The optimum amount can be easily determined. If the hardener is an amine, 0.75 to 1.25 equivalents of active hydrogen bound to amino nitrogen per epoxide equivalent are normally used. If the hardener is a polycarboxylic acid or an anhydride thereof, then normally 0.4 to 1.5 equivalents of carboxyl group or anhydride group are used per equivalent of epoxy group. If the hardener is a polyphenol, it is convenient to use 0.75 to 1.25 phenolic hydroxyl groups per epoxide equivalent.

Catalytic hardeners are generally used in amounts of 1 to 40 parts by weight per 100 parts by weight of epoxy resin.

Accelerators may also be used for the curing. Examples of such accelerators are: tertiary amines, the salts or quaternary ammonium compounds thereof, e.g. benzyldimethylamine, 2,4,6-tris(dimethylaminomethyl)phenol, 1-methylimidazole, 2-ethyl-4-methylimidazole, 4-aminopyridine, tripentylammonium phenolate, or alkali metal alcoholates such as sodium alcoholates of 2,4-dihydroxy-3-hydroxymethylpentane. Curing of the mixtures of the invention is conveniently carried out in the temperature range from 15° to 300° C., preferably from 25° to 250° C.

Curing can be carried out in known manner in two or more steps, the first curing step being effected at low temperature and the post-curing at higher temperature.

If desired, curing can be carried out in two steps such that the curing reaction is first prematurely discontinued or the first step is carried out at slightly elevated temperature to give a still fusible and/or soluble curable precondensate (B-stage) from the polyglycidyl ether and the hardener. Such a precondensate can be used, for example, as varnish component and, in some cases, for the preparation of prepregs.

The term "curing" as employed herein means the conversion of the soluble, normally solid, fusible polyepoxides into insoluble and infusible three-dimensionally crosslinked products or moulding materials, which are usually simultaneously shaped to moulded articles such as castings, mouldings and laminated materials, and to impregnations, bonds and, in particular, coatings or varnish films.

The curable mixtures of this invention may further contain, depending on the end use, suitable plasticisers such as dibutyl phthalate, dioctyl phthalate or tricresyl phthalate.

Finally, the curable mixtures can be blended, before curing, in any phase with diluents, fillers and reinforcing agents, for example coal-tar, bitumen, textile fibres, glass fibres, asbestos fibres, boron fibres, carbon fibres, mineral silicates, mica, powdered quartz, alumina trihydrate, bentonites, kaolin, silica aerogel or metal powders, for example aluminium powder or iron powder, and also pigments and dyes such as carbon black, oxide colorants, titanium dioxide and the like. It is also possible to add other customary modifiers, for example flame retardants such as antimony trioxide, and thixotropic agents to the curable mixtures.

The preparation of the curable mixtures of this invention can be effected in conventional manner using known mixing units (stirrers, kneaders, rolls and the like).

The curable epoxy resin mixtures of this invention are used, in particular, in the fields of surface protection, electrical engineering, laminating and construction. They can be used in a formulation adapted to suit each particular end use, in an unfilled or filled state, as paints, varnishes, such as sintered powder coating competitions, as compression moulding materials, dipping resins, casting resins, injection moulding formulations, impregnating resins and adhesives, tool resins, laminating resins, sealing and patching compounds, flooring materials and binders for mineral aggregates.

Owing to the low chlorine content of the polyglycidyl ethers, these epoxy resins are particularly suitable for applications in which the corrosion of metals in contact with the resin proves troublesome, for example in the electrocoating of metals, as components of varnishes and paints and of adhesives and electrical insulating materials.

The cured products obtained with the polyglycidyl ethers of this invention are distinguished by good chemical, thermal and mechanical properties, especially by excellent fastness to solvents, light and atmospheric influences, as well as by good adhesion.

In view of their properties, the curable mixtures of this invention are suitable for the preparation of crosslinked products, especially of powder coating compositions. Hence the present invention further relates to the use of the curable mixtures for making crosslinked products and especially to the use thereof as components of powder coating compositions.

If desired, further modifiers such as light stabilisers, dyes and, in particular, deaerating agents, flow control agents and/or pigments, may be added to the powder coating compositions.

Examples of flow control agents are: polyvinyl acetals such as polyvinyl butyral ("Movital" B 30 H ®, supplied by Hoechst), polyethylene glycol, polyvinyl pyrrolidone, glycerol, acrylic copolymers such as "Modaflow" ® or "Acrylron" MFP ®, supplied by MONSANTO and PROTEX respectively, as well as silicones, waxes or stearates (some of which may also be used as mould release agents). Benzoin is preferably used as deaerating agent.

The novel powder coating compositions can be prepared by simply mixing the components, for example in a ball mill. Another possible method of preparation comprises melting the components together, preferably in an extruder, for example in a Buss Kokneader, and then comminuting the cooled melt. The compositions preferably have a particle size in the range from 0.015 to 500 μm, most preferably from 10 to 75 μm.

The powder coating compositions are applied in known manner to the substrate to be coated and heated preferably to a temperature of not less than 120° C., preferably in the range from 150 to 250° C., to cure the resin. The coatings so obtained are hard, they are resistant to solvents and weathering, and they have excellent gloss and good adhesion.

The following Examples illustrate the invention in more detail.

EXAMPLE 1

Example 1: Preparation of the polyglycidyl ether 500 g of Kunstharz SK ® (modified hydroxylated acetophenone/formaldehyde resin, supplied by Hüls AG; hydroxyl content: 5.3 eq./kg) and 19.7 g of a 50% aqueous solution of tetramethylammonium chloride are dissolved at 60° C. in 1470 g epichlorohydrin. The pressure is lowered to 15 kPa, whereupon epichlorohydrin begins to distill through a water separator. Over the course of 2 hours, 240 g of a 50% aqueous solution of sodium hydroxide are added dropwise and the water of reaction is removed continuously by distillation, while epichlorohydrin is returned to the reactor. After complete removal of the water, the mixture is heated for a further 2 hours and then cooled to room temperature. Precipitated NaCl is removed by filtration and the filtrate is washed with epichlorohydrin. The combined epichlorohydrin solution is washed with 300 ml of a 10% aqueous solution of $NaH_2PO_4$ and with water and then dried over $Na_2SO_4$.

The solvent is removed in a rotary evaporator and the residue is dried at 135° C./2 kPa, affording 587.2 g of a slightly yellowish solid resin with the following properties:

$\overline{M}_n$ (gel permeation chromatography in THF)=891
$\overline{M}_w/\overline{M}_n = 1.41$
epoxy value=3.02 eq./kg
softening point=84° C.
total chlorine content=0.1% by weight.

EXAMPLE 2: Preparation of a powder coating composition

Components:
170 g of polyglycidyl ether according to Example 1,
830 g of a solid carboxyl-terminated saturated polyester (URALAC ® 3400, supplied by Scado, acid content: 0.61 eq./kg),
20 g of a mixture of 12.5 parts by weight of alkyltrimethylammonium bromide (Morpan ® CHSA, supplied by ABM Chemicals), and 87.5 parts by weight of a solid, saturated, carboxyl-terminated polyester resin (Neoxil ® TPC 83, supplied by Savid).

The components are ground together for 30 seconds in a free-falling mixer. The powder is then applied to an aluminium sheet and cured for 30 minutes at 180° C. The varnish film so obtained has a thickness of 40–60 μm. The test values are reported in the Table.

TABLE

| Test | |
|---|---|
| Erichsen indentation (DIN 53 156, mm) | >10 |
| impact resistance[1] (cm.kg) | 50 |
| acetone test[2] (rating) | 3 |
| adhesion[3] (cross-hatch adhesion test rating) | 0 |

A force of known weight is dropped from a specific height on to the back of the coated aluminium sheet. The value obtained (height x weight) indicates the greatest impact at which the film still remains intact.

A rag impregnated with acetone is left to lie for 1 minute on the coated surface. The treated surface is then scratched with the fingernail to test the solvent resistance. Evaluation is made in accordance with a rating from 0 to 5, 0 denoting excellent resistance and 5, 0poor resistance.

Evaluation is made in accordance with a rating from 0 to 5, denoting excellent adhesion and 5 adhesion.

What is claimed is:

1. A polyglycidyl ether which is obtained by reacting acetophenone with 0.7 to 1.4 mol of formaldehyde per mol of acetophenone, in the presence of an alkaline catalyst and in the temperature range from 50 to 100° C., to a carbonylated acetophenone/formaldehyde resin, hydrogenating said carbonylated resin to a modified hydroxylated acetophenone/formaldehyde resin, subsequently converting said resin with epichlorohydrin, in the presence of a phase transfer catalyst, into the corresponding polychlorohydrin ether, and dehydrochlorinating said ether with a base.

2. A polyglycidyl ether according to claim 1, wherein 0.9 to 1.1 mol of formaldehyde is used per mol of acetophenone.

3. A polyglycidyl ether according to claim 1, wherein 0.05 to 0.3 mol of alkaline catalyst is used per mol of acetophenone.

4. A polyglycidyl ether according to claim 1 wherein the alkaline catalyst is an alkali metal hydroxide, an alkaline earth metal hydroxide or oxide, an alkali metal alcoholate or an organic base.

5. A polyglycidyl ether according to claim 1, wherein the reaction to the carbonylated acetophenone/formaldehyde resin is carried out in the temperature range from 60 to 90° C. over 2 to 5 hours.

6. A polyglycidyl ether according to claim 1, wherein the hydrogenation of the carbonylated resin to the hydroxylated resin is carried out in an inert solvent or in the melt in the presence of a hydrogenation catalyst.

7. A polyglycidyl ether according to claim 1, wherein the reaction of the hydroxylated acetophenone/formaldehyde resin to the polyglycidyl ether is carried out with an excess of epichlorohydrin without a solvent, the phase transfer catalyst and the base being added in the form of aqueous solutions.

8. A polyglycidyl ether according to claim 1 having a molecular weight $\overline{M}_n$ of 800–1100, a $\overline{M}_w/\overline{M}_n$ of 1.20–1.60, an epoxy value of 2.5–3.5 equivalents/kg, and a softening point of 70–100° C.

9. A polyglycidyl ether according to claim 1 which contains recurring units of formula I

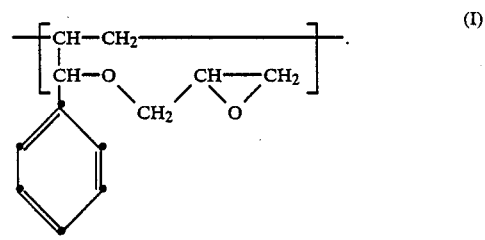

10. A polyglycidyl ether according to claim 1 of formula II

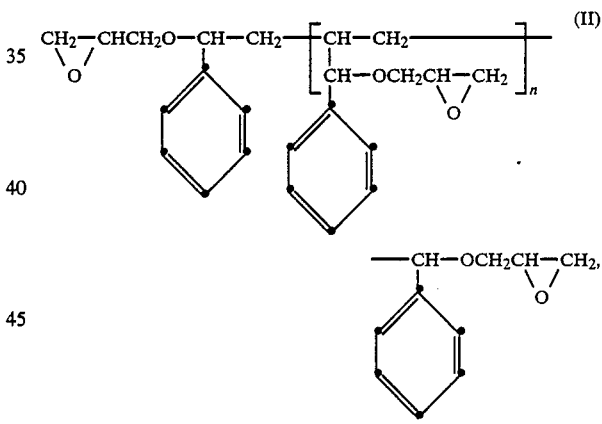

wherein n is an integer from 1 to 5.

11. A curable mixture comprising
(a) a polyglycidyl ether according to claim 1, and
(b) a hardener and/or a curing catalyst for epoxy resins.

* * * * *